W. STRAIT.
TRACTOR TRUCK.
APPLICATION FILED JUNE 6, 1917.
1,349,791.
Patented Aug. 17, 1920.
4 SHEETS—SHEET 3.
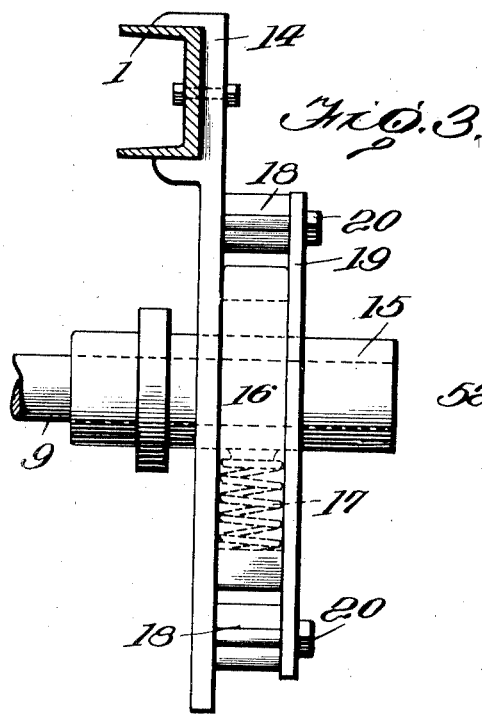
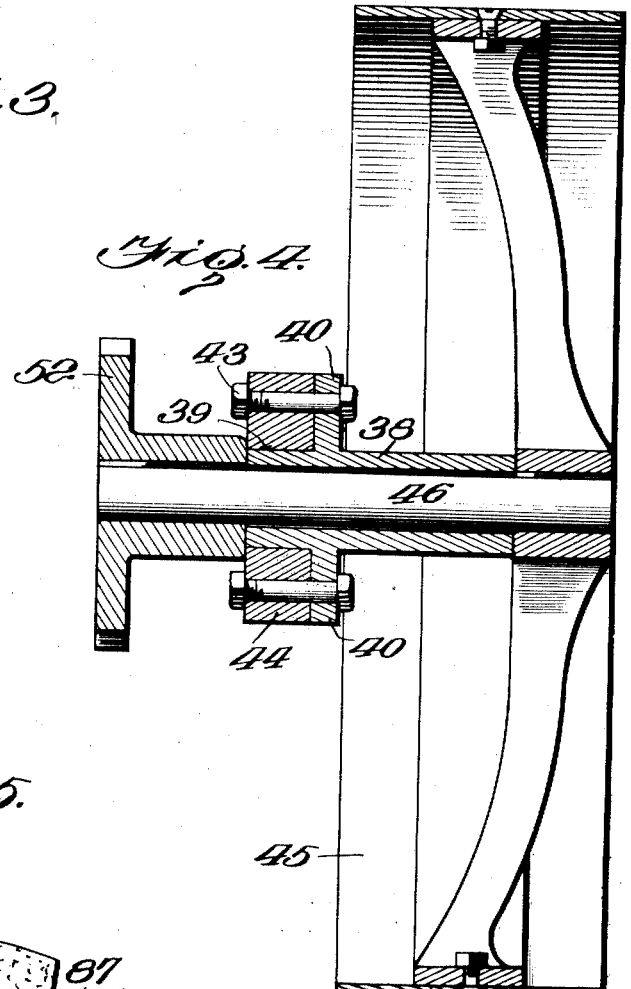
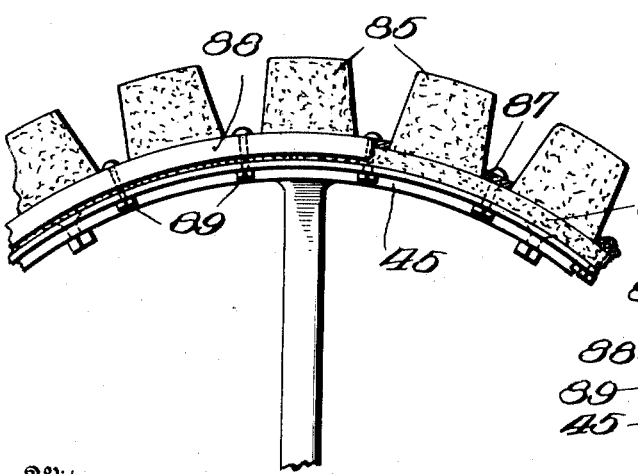
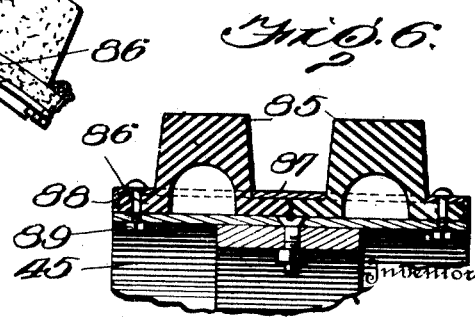

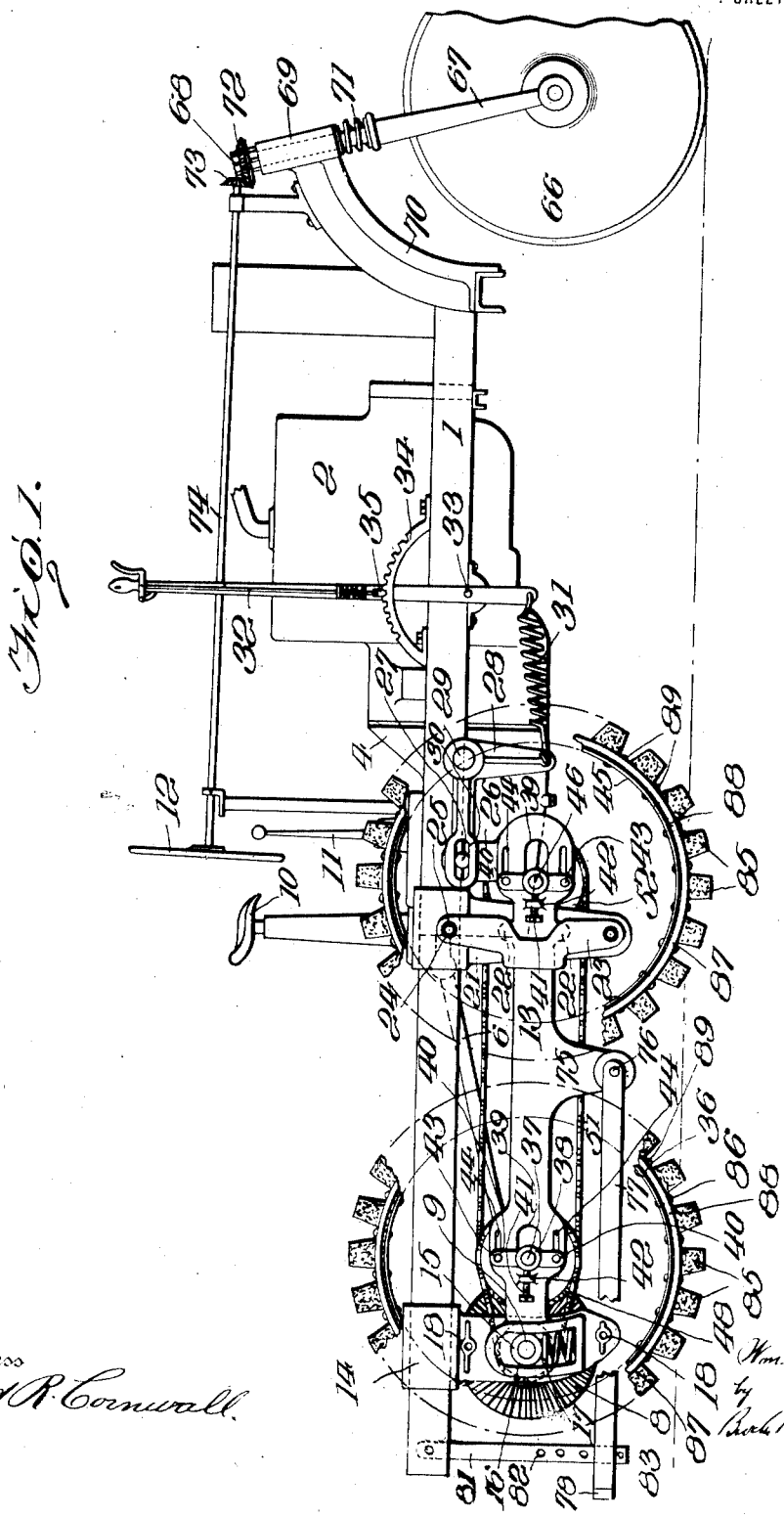

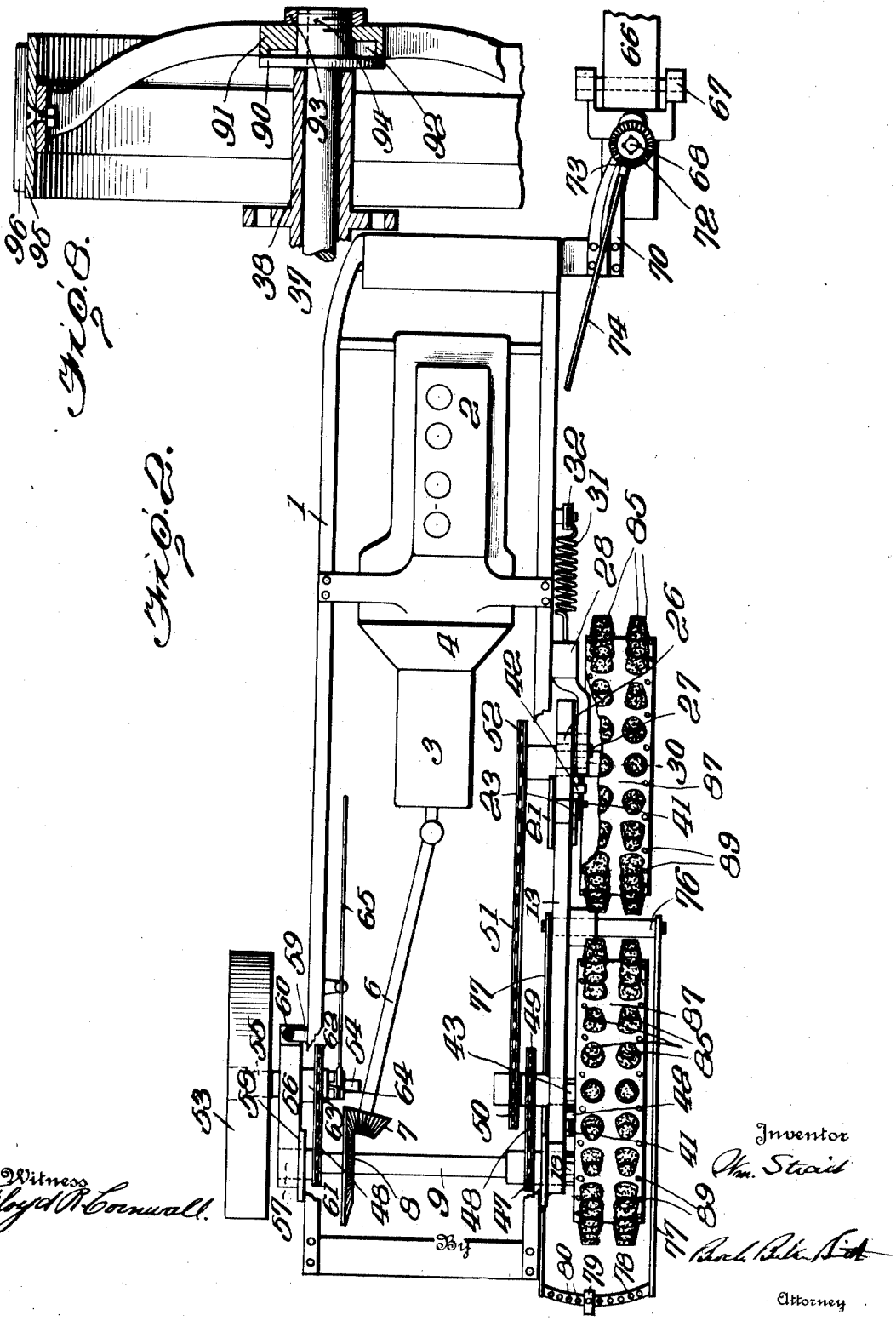

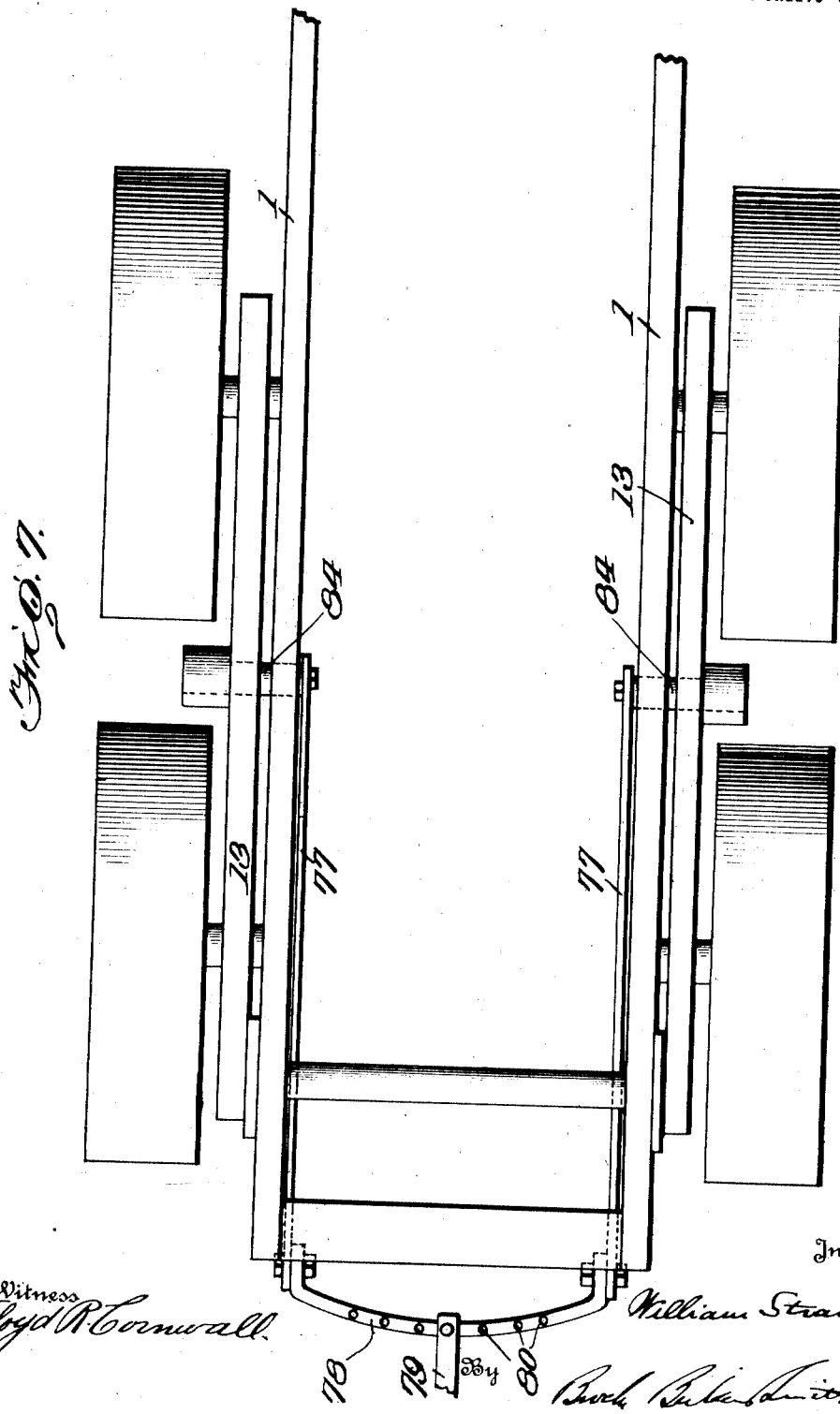

UNITED STATES PATENT OFFICE.

WILLIAM STRAIT, OF APPLETON, WISCONSIN, ASSIGNOR TO THE CLEVELAND TRACTOR COMPANY, OF EUCLID, OHIO, A CORPORATION OF OHIO.

TRACTOR-TRUCK.

1,349,791.   Specification of Letters Patent.   Patented Aug. 17, 1920.

Application filed June 6, 1917. Serial No. 173,167.

*To all whom it may concern:*

Be it known that I, WILLIAM STRAIT, a citizen of the United States, and resident of Appleton, Wisconsin, have invented certain new and useful Improvements in Tractor-Trucks, of which the following is a specification.

The general object of the invention is to provide a motor vehicle which is well adapted either to be used as a truck for carrying goods or as a tractor for plowing, hauling, etc. To this end wide gear ratio variations are provided in the transmission mechanism to provide for driving at several different speeds, from the very low speed required for plowing or other farm work, through the intermediate and higher speeds used for carrying goods.

To the same end also the ground-engaging supporting and driving devices are especially arranged to suit different conditions of speed, load and draw-bar pull; and the main frame of the machine is flexibly supported in relation to all of its ground-engaging devices so that the engine and other mechanism and the load, when the machine is used as a truck, are fully protected against road shocks at all times.

To carry out the foregoing and other subordinate objects the machine comprises one or more combined supporting and driving instrumentalities, each of which includes two or more ground-engaging wheels which are usually arranged in line with each other. These wheels with their connecting frame or truck may be called for identification a "traction unit." The truck of this unit is flexibly connected to the main frame so that the latter is cushioned in respect to all of the road wheels of the unit. In a preferred construction this is accomplished by interposing flexible devices between the main frame and the truck near each end of the latter. In a preferred construction also the truck is arranged to have a swinging or pivotal movement at a point near one of its spring supported ends, usually the rear end, and the other end of the truck, usually the forward end, is permitted to move substantially in the arc of a circle against its spring mechanism. The spring devices for the forward end of the truck are also preferably made adjustable so that the pressure on the forward wheel or wheels of the truck may be relieved or the front end of the truck actually raised to facilitate turning.

Such a traction unit is usually arranged at one side of the machine and supporting means are then provided at the other side consisting, in a preferred construction, of one or more wheels flexibly connected to the main frame and arranged in line with each other. This supporting unit may be substantially a duplicate of the traction unit previously described, and in that case will also perform a driving function; or it may consist of a single wheel flexibly connected, and in either case releasable driving connections may be provided for either this second supporting or traction unit, or the one first described, to facilitate turning the machine or, for relieving strains upon the mechanism which might be otherwise caused by driving the two units simultaneously at the same speed. By this provision in many cases, differential mechanism interposed in the driving line between the two traction units may be dispensed with, thus greatly simplifying and cheapening the general construction of the tractor.

Provision is also made for adjusting the driving connections of the two or more wheels of the traction units; for guiding the tractor trucks in respect to lateral movement, and for otherwise supporting these trucks in their vertical movement. Provision is also made for connecting the draft means to either or both of the traction units in such a way that the ground contact of the ground-engaging devices is varied in accordance with the draw-bar pull, and also with the main frame of the machine and the spring connections are relieved of the strains which are incident to the connection of draft means to the main frame.

Provision is also made for equipping one or more of the ground wheels with detachable flexible tread members which serve the same general purpose as rubber tires in ordinary motor vehicles and also, by yielding, facilitate turning the machine when two or more of the ground wheels are in contact with the ground at the same time.

Provision is also made for flexibly supporting the main frame in respect to the ground-engaging steering device or devices which are usually located near the front of the machine.

I will now describe certain exemplifying embodiments of the invention shown in the accompanying drawings, and after considering these it will be evident to those skilled in the art that the principles of the invention may be embodied in other forms, and I do not limit myself to details except as claimed.

Figure 1 is a side elevation of a machine embodying the invention;

Fig. 2 is a top plan of the same;

Fig. 3 is a detail, in a transverse plane of the machine, of the pivotal and spring support for one end of one of the tractor trucks;

Fig. 4 is a sectional detail, in the vertical plane of its axis, of one of the ground wheels with its driving and adjusting devices;

Fig. 5 is a detail, partly in side elevation and partly in section of one of the ground wheels with its detachable flexible tread members;

Fig. 6 is a transverse section of the same;

Fig. 7 is a top plan of the rear part of the machine of modified construction employing two traction units with modified draft means adapted to that arrangement;

Fig. 8 is a sectional view of a modified form of ground wheel.

Referring to Figs. 1 to 4, the main frame 1 preferably carries the engine 2 near the front. At the rear of the engine is gear box 3, and a clutch is usually provided within the housing 4. The engine, clutch and gear box may conveniently be made as an operative unit, as is well-known in motor vehicle practice, although this is not essential. The gear box 3 preferably contains a plurality of gear combinations of wide range, giving a number of speeds running from a very low speed to a relatively high one, sufficient, for example, to drive the machine from ten to fifteen miles an hour when it is used as a truck on good roads.

Power is delivered from the gear box through universal joint 5, propeller shaft 6, pinion 7, and gear 8 to a main driving shaft or axle 9, from which the traction wheel or wheels may be driven. The gear 8 may for convenience be arranged near one side of the machine although this is not essential.

The described arrangement of power plant and transmission mechanism permits a large part of the main frame at the rear to be left clear and unobstructed so that any suitable platform or body may be mounted on this part of the frame for trucking purposes. The driver's seat 10 is preferably arranged as close as convenient to the rear end of the power plant and controlling devices such as gear shift lever 11, steering wheel 12 and other necessary controlling devices (some of which are not shown) are located in positions convenient to the driver.

A traction unit of which most of the parts are carried by the bar or truck frame 13 is arranged at one side of the machine near the rear. The rear end of the frame is supported by a bracket 14 secured to the main frame. This bracket has a projecting sleeve or hub 15 which protrudes through an arc-shaped guide slot 16 in the rear of the frame. This sleeve bears upon spring 17 located in the guide slot. The bracket is provided with winged lugs 18 projecting outward substantially the same distance as the thickness of the rear end of the truck frame, and a guide plate 19 is clamped against these lugs by nuts 20. This plate is provided with a slot registering with the slot in the frame member, to accommodate the sleeve 15. The plate 19 is shown in Fig. 3 but is omitted from Fig. 1 for the sake of clearness. A bracket 21 is located near the front end of truck frame 13 for guiding the latter. The frame member has upward and downward extensions 22 to increase the area of contact with the guiding means. At one side the part of the frame adjacent to these extensions rests against the bracket and at the other side the frame and the extensions are engaged by a guide plate 23 resting against bracket lugs 24 which project substantially the same distance as the thickness of the frame. The guide plate is clamped to the lugs by nuts 25.

The frame member 13 extends forward of the bracket 21 and is provided with an upstanding arm 26 carrying a stud 27. A bell crank 28 is pivoted on a stud 29 carried by the main frame. One arm of this bell crank has a slot 30 to engage the stud 27 and the other arm is connected to a spring 31. The other end of this spring is connected to the long end of a lever 32 fulcrumed at 33 on the main frame. This lever is provided with a ratchet sector 34 and ratchet 35 with suitable hand devices to move and lock the lever in different positions to vary the tension of spring 31.

The rear ground wheel 36 of the traction unit is carried by an axle 37 which passes through a bearing sleeve 38. This sleeve extends through a slot 39 in frame 13 and is provided with lugs 40 extending upward and downward against the outer face of the frame. The shaft is adjusted to tighten the driving chain (described below) by a screw 41 engaging a boss 42 on the frame and bearing against sleeve 38 and is locked in adjusted position by bolts 43 passing through the lugs 40 and slots 44 in the frame above and below slot 39.

The forward ground wheel 45 of the traction unit is carried by a shaft 46 and this shaft is provided with a bearing sleeve and adjustment means substantially identical with those previously described and similarly numbered, the only difference being that the adjustment slots for shaft 46 are made longer than the similar slots for shaft 37 to provide for the greater range of adjustment necessary for the forward wheel.

The main drive shaft 9 carries a sprocket 47 connected by a chain 48 with a larger sprocket 49 on shaft 37 of the rear ground wheel. This shaft also has a sprocket 50 connected by a chain 51 with a sprocket 52 on shaft 46 of the forward ground wheel. Sprockets 50 and 52 are usually of the same diameter to drive the wheels 36 and 45 at the same speed when the wheels are of the same diameter, but if it is desired to make the wheels of different diameters the sprockets may be of different diameters to secure the proper surface speeds of the two wheels.

The traction unit as above described operates as follows: When the spring 31 is adjusted to proper tension by lever 32 the bell crank 28 yieldably holds the front end of the frame 13 and the wheel 45 against the ground. Upon encountering obstructions the wheel and the front end of the frame will rise and in this movement the frame pivots upon the sleeve 15, the pivot axis being co-incident with the axis of the main drive shaft 9. When the rear wheel 36 encounters obstructions the rear end of the frame 13 rises in relation to the main frame, the slot 16 embracing the sleeve 15 rising in respect to the sleeve, and the spring 17 being compressed between the sleeve and the bottom of the slot. The guide slot 16 has the shape of an arc struck from the center of rear wheel shaft 37 and therefore in all positions of the frame the same distance between the centers of shafts 9 and 37 is maintained so that the drive chain 48 is not affected by this movement. In the vertical movement of the frame it is guided near each end and prevented from twisting by plates 19 and 23 which closely confine the frame between them and the brackets 14 and 21 respectively.

When turning the vehicle sharply, or in soft ground, tension on the spring 31 may be relaxed to relieve ground pressure of wheel 45, and if lever 32 is pushed forward sufficiently, spring 31 closes up and acts as a thrust link to positively raise the front end of the tractor truck. The weight of the machine acting through shaft 37 as a fulcrum also assists in raising the front end of the truck when spring pressure is relaxed. Other means are provided to facilitate turning, as later described.

When the above described traction unit is provided at one side of the machine the other side may be supported by the wheel 53 which may be merely a supporting wheel or a driving wheel also. The wheel 53 is carried by shaft 54 which passes through the long bearing sleeve 55. This sleeve is mounted at an intermediate point on a swinging arm 56 which is pivoted at its rear end about bearing sleeve 57 through which passes the adjacent end of the main driving shaft 9. The sleeve 57 is carried by a bracket 58 extending down from the main frame. The forward end of arm 56 lies under a lug 59 on the main frame and a spring 60 compressed between lug 59 and the end of frame 56 yieldingly supports the frame in relation to wheel 53.

Main shaft 9 has a sprocket 61 which drives by a chain the sprocket 62 on the inner end of wheel shaft 54 and the ratio of sprockets 61 and 62 is preferably the same as that of sprockets 47 and 49 of the traction unit above described.

In a preferred construction the sprocket 62 has its hub 63 loosely mounted on shaft 54 and a clutch member 64, which may be a friction clutch, but as shown is a positive clutch, is splined on the shaft and is arranged to be engaged and disengaged with the hub by shifting lever 65, the forward end of which is brought to a position convenient to the driver. By engaging the clutch 64 with the hub of sprocket 62 wheel 53 is driven from the shaft 9 and aids in driving the vehicle, but when the clutch is disengaged the wheel runs free and then there is no impediment to turning the machine sharply as is the case if driving connection is maintained between shaft 9 and both the right and left hand driving units. The provision of this or equivalent releasing devices largely eliminates the necessity for differential gearing on the drive shaft although such gearing may be supplied on the drive shaft if desired.

Steering may be effected by different means. In the preferred construction shown, a single ground-engaging steering wheel 66 is mounted directly in line with the wheels of the right hand traction unit. This wheel is carried by a fork 67. The fork has a stem 68 which is free to turn for steering and also to move up and down for a suitable distance through the steering head 69 connected to the main frame by bracket 70. A spring 71 is placed about the stem 68 between the lower end of head 69 and the crown of the steering fork, and this cushions the main frame in respect to the steering wheel in the normal positions of the frame. If the front end of the machine is elevated very much by irregularities of the ground, stem 68 is free to slide down through the head 69 even beyond the limit of the spring action and so to maintain steering contact with the ground. A gear 72 is held by suitable bearings and is splined to engage the stem 68 which is free to slide through the gear. A pinion 73 carried by the forward end of shaft 74 on the rear end of which the steering hand wheel 12 is mounted completes the means by which the driver may control the direction of the vehicle.

Other steering mechanisms may be employed. For instance a steering wheel with appurtenance similar to that described may be placed at each side of the machine at the front and in that case the forks of the two wheels will be suitably connected to move simultaneously for steering.

Fig. 7 shows that a traction unit similar to the right hand traction unit of Figs. 1 and 2 above described, may be placed at each side of the machine. In that case the driving connections for the left hand unit will be substantially the same as described for the other unit.

Figs. 1 and 2 show an improved draft rigging in which the traction frame member 13 is provided with the depending member 75 through which passes a transverse bar 76 long enough to extend beyond wheel 36 at each side and also to avoid any frame members. From each end of this bar one of the draw-bars 77 extends rearwardly below the rear pivot axis of the frame. The rear ends of the draw-bars are connected by a cross-rail 78 which may be curved rearwardly and on this may travel a sliding link 79 for connection to the load to be pulled. The cross-rail may also be provided with holes 80 in which coupling pins may be inserted to connect the load. The rear ends of the draw bars may be supported by swinging links 81 depending from the main frame, and these links may be provided with holes 82 to receive pins 83 to engage the draw-bars 77 and hold them in different vertical positions.

By the described arrangement the pull of the load is transferred to the frame of the traction unit at a point below its pivot axis and the ground engagement of the forward wheel or wheels is therefore varied with the pull.

Fig. 7 shows an equivalent arrangement in connection with two traction units in which the draw-bars 77 and their cross-rail 78 are substantially the same except for the length of the cross-rail; but in this case the forward ends of the draw-bars are connected to inwardly projecting studs 84, one of which is connected to each of the traction frames 13. By this arrangement the pull of the load is transferred below the pivot axis to each of the traction units.

It is desirable in many cases to provide one or more of the road wheels with flexible or yieldable treads to protect smooth roads from injury, to cushion the machine additionally, to facilitate turning by the lateral yielding of the treads and to increase traction in soft ground when the tread surfaces are designed for that purpose. To this end in one representative construction all of the wheels or any one of them, for example, wheel 36, as shown in Figs. 5 and 6, may be provided with rubber tread blocks 85. A plurality of these projecting tread members may be carried or made substantially integral with the bases 86 forming segmental tread pieces, each of which has a plurality of projecting studs or tread members 85. The tread pieces may be so arranged that a single annular row of studs 85 is provided or each base piece may have a plurality of rows of studs, as indicated in Fig. 6. Otherwise two of the base segments may be placed side by side and secured by a common fastening means, as also indicated in Fig. 6. Suitable detachable fastening means for the tread blocks consist of segmental curved channel-shaped plates 87 of which the edges 88 are curved down to meet the edges of the wheel rim. The plates 87 are apertured to accommodate the projecting tread members 85 and the plates are secured to the wheel rim by detachable bolts 89. Detachable flexible treads of the kind described evidently provide for all of the objects above mentioned. They are especially advantageous, however, where in a single traction unit there are two wheels, as for instance, the wheels 36 and 45, in engagement with the ground at the same time and it is desired to turn the vehicle quite sharply. In that case the flexible tread members on the two wheels yield laterally in opposite directions sufficiently to permit turning without appreciably straining the mechanism or adding to the driving resistance. This feature is also desirable in cases where two wheels at opposite sides of a machine, as for instance, the wheels 36 and 53, are driven from a single shaft without differential gearing and it is desirable to make a sharp turn. In that case the two wheels have to travel over arcs of different lengths in the same time and flexible tread blocks will yield in opposite directions, forward and backward, sufficiently to accommodate the turning action without appreciably straining the mechanism or seriously adding to the driving resistance. This last described function of the flexible treads permits differential mechanism to be dispensed with in many cases where it would otherwise be necessary.

The number of wheels which may be carried by one of the tractor frames 13 to constitute a single traction unit is not limited to two. Three or even more road wheels may be placed on a single frame and driven by the addition of other sprockets and chains in a manner which will be obvious from the previous description.

Some or all of the road wheels are preferably made in dished form, as clearly shown in Figs. 2 and 4, that is the hubs are placed near the outsides of the wheels and the spokes are curved inwardly to the centers of the rims. This enables the bearing sleeves to be made long and to give stiffness and wearing qualities to the bearings and at the same time brings the center of the treads close to the frame members and as close as possible to the plane in which power is applied to the shafts to drive them, thus eliminating twisting effects as much as possible.

In some cases it is desirable to have some or all of the ground wheels demountable as units from their shafts, so that for a single machine wheels having different treads could be provided, for instance, one set of wheels having rubber block treads and one set having steel treads, either spiked or smooth, and these could be easily interchanged to suit different conditions of use. Fig. 8 shows a construction in which one of the wheel shafts 37 is provided with a flange 90 against which the wheel hub 91 rests, and this flange is provided with lugs 92 fitting sockets in the hub to rigidly lock the hub to the shaft in respect to rotary movement. The hub is detachably held in place against the flange and lugs by a nut 93 engaging screw thread 94 on the shaft, and for greater safety the nut 93 may have any suitable quickly operable locking devices not shown. The rim 95 of this wheel may be smooth or it may have metal lugs or spikes 96 to afford increased traction for plowing or the like; and these lugs or spikes may or may not be detachable from the rim.

One or more wheels with one form of tread, as shown in Fig. 8, may be provided with one or more wheels with other forms of treads, such, for instance, as shown in Figs. 1, 2 and 4 to 6; and these wheels may then be readily interchanged to suit different ground conditions.

I claim:—

1. In a machine of the class described, the combination of a main frame, an arm flexibly connected near one of its ends to the main frame, a cushioning device interposed between the main frame and arm near said connection, cushioning means interposed between the main frame and said arm near the other end of the latter, and ground engaging wheels carried by said arm substantially in line with each other.

2. The same as claim 1 with the addition of a motor, a drive shaft carried by the main frame substantially in line with said pivot connection, a driving connection between the motor and said shaft, and a driving connection between said shaft and said ground wheels.

3. In a vehicle of the class described, the combination of a main frame, a motor and a transverse drive shaft thereon, a floating wheel arm connected to the main frame at each side thereof adjacent to the axis of said drive shaft, at least one ground engaging wheel carried by each of said arms forward of its pivot axis, and cushioning means supporting the main frame in relation to the free ends of each of said arms.

4. Same as claim 3 with the addition of means for vertical movement of said arms in relation to the main frame adjacent to their pivot connections and additional cushioning means between the main frame and said arms adjacent to said pivot connections.

5. Same as claim 3 with the addition of means for connecting and disconnecting the wheels of one of said arms with the drive shaft.

6. In a machine of the class described, the combination of a main frame, a drive shaft thereon, a traction frame member connected at its ends to the main frame for vertical and pivotal movement in relation to the main frame, at least one ground wheel carried by said traction frame member forward of said connection, spring means intermediate the main frame and the traction frame member adjacent to said connection and also adjacent to the other end of said frame member, and vertical guideways between the main frame and the traction frame member having contact points considerably separated in a vertical direction to guide the traction frame member in its vertical movement and prevent twisting.

7. In a machine of the class described, the combination of a main frame, a drive shaft thereon, a traction frame member connected to move vertically with respect to the main frame, one or more long bearing sleeves carried by the traction frame and extending at one side thereof, wheel shafts mounted in said bearings and ground wheels carried by said shafts at one side of the traction frame.

8. Same as claim 7, with the addition that the ground wheels are dished to bring their rims close to the frame and to accommodate said long bearing sleeves.

9. The same as claim 7 with the addition of relatively long vertical guideways intermediate the traction frame member and the main frame to prevent oscillation of the traction frame member and prevent twisting of said member under the offset load carried on its wheels.

10. The combination in a machine of the class described, of a main frame, a drive shaft thereon, a bracket on the main frame having a projection, a bearing on said projection for the shaft, a floating traction frame member flexibly connected to have vertical movement adjacent to said projection, one or more ground wheels carried by the traction frame member, and driving connections between said shaft and ground wheels.

11. The combination in a machine of the class described, of a main frame and drive shaft thereon, a bracket on the main frame having a projection, a bearing on the projection for the shaft, a floating traction frame member flexibly connected to have vertical movement adjacent to said projection, one or more ground wheels carried by said traction frame member, driving connections between the said shaft and the ground wheels, a guide plate on the bracket for the traction frame member, and a second bracket and guide plate engaging the traction frame near the opposite end to prevent twisting and laterally guide the frame member.

12. In a machine of the class described, the combination of a main frame, a floating wheel arm flexibly connected to the main frame, at least two ground wheels carried by the arm substantially in line and forward of the pivot connection, and draft means connected to said arm so that the draft pull is below the axis of said pivot connection.

13. In a machine of the class described, the combination of a main frame, a drive shaft thereon, a floating traction frame flexibly connected near the axis of the drive shaft, a plurality of ground wheels on the traction frame, the axle of the rearmost wheel being forward of the pivot center.

14. Same as claim 13, with the addition of spring means to hold down the forward end of the traction frame with variable resistance.

15. In a machine of the class described, the combination with a main frame of two ground engaging traction wheels arranged substantially in line with each other, and flexible separate tread projections on at least one of the wheels to facilitate turning of the vehicle.

16. In a tractor, the combination of a main frame, a bearing sleeve thereon, a drive shaft carried in said sleeve, a wheel arm having a pivotal and sliding connection about said sleeve, at least two ground engaging wheels carried by said arm forward of said connection, and a spring operatively interposed between the arm and the main frame adjacent to said connection.

17. The same as claim 16 with the addition of a spring interposed between main frame and a forward portion of said arm.

18. In a tractor, the combination of a main frame, a wheel arm, two wheel shafts connected to the arm, a wheel carried by each shaft, the wheels being substantially in line, sprockets on the wheel shafts and a chain connecting them, an extension provided on said arm to the rear of the rearmost wheel shaft, a drive shaft carried by the main frame, a combined sliding and swinging connection between the main frame and said arm extension adjacent to the axis of the drive shaft, sprockets carried by the drive shaft and the rearmost wheel shaft, and a chain connecting them.

19. Same as 18 with the addition of a spring intermediate the main frame and said arm extension adjacent to said connection.

WILLIAM STRAIT.